Patented Dec. 1, 1936

2,062,541

UNITED STATES PATENT OFFICE 2,062,541

SAFETY GLASS

Roy W. Wampler, Toledo, Ohio, assignor to Libbey-Owens-Ford Glass Company, Toledo, Ohio, a corporation of Ohio No Drawing. Application March 30, 1932,
Serial No. 602,113

10 Claims. (Cl. 49—81)

The present invention relates to the art of safety glass manufacture.

Safety glass, sometimes called laminated glass, broadly speaking, is composed of two sheets of glass with an interposed layer of plastic material bonded to the inner surfaces of the glass to provide a composite structure. The customary plastic material heretofore used in the making of safety glass is pyroxylin plastic. Pyroxylin plastic is ordinarily formed by colloidizing nitrocellulose with camphor.

For some years past, it has been the aim of many in the art to develop a satisfactory process of using cellulose acetate plastic because cellulose acetate plastic is more stable to light and heat energy than the common forms of pyroxylin plastic. It has been found, however, that the bonding of cellulose acetate plastic to glass presents even greater difficulties than the bonding of pyroxylin plastic to glass.

I have for some time been engaged in an extensive research program for the purpose of obtaining an adhesive or bonding material adapted for the satisfactory bonding of glass and cellulose acetate plastic. In the carrying forward of this research program, a number of types and varieties of cellulose acetate furnished by the various cellulose acetate manufacturers were investigated with the idea of preparing adhesives by dissolving or dispersing the cellulose acetate in plasticizers of high boiling point, low vapor pressure solvents or mixtures thereof. As a matter of fact, many attempts have been made to use other cellulose esters than the cellulose acetate in the making of an adhesive to be used for bonding glass and cellulose acetate plastic. Various forms of cellulose nitrates were tried as well as various types and forms of cellulose ethers.

While an occasional sample of the cellulose acetate, when dissolved or dispersed in a suitable plasticizer and used as a bonding adhesive between glass and cellulose acetate plastic, gave satisfactory results, the greater majority of such cellulose acetate samples were worthless as bonding adhesives.

I have discovered that by taking any of the various cellulose acetate samples as received from the manufacturer and reacting the same with a proper depolymerizing agent in a suitable manner, the reaction product thereby obtained and recovered, as will be pointed out hereinafter, has proven to be a valuable ingredient of a mixture useful in the bonding of glass and cellulose acetate plastic laminations.

As a matter of fact, samples of cellulose acetate that could not otherwise be satisfactorily employed were, when subjected to a treatment in accordance with my invention, rendered entirely satisfactory for commercial purposes.

For example, I have discovered that by treating a sample of cellulose acetate dissolved in acetone with a depolymerizing agent such as phosphorus oxychloride in the proper proportions and allowing it to react for approximately two hours, the reaction product thereby obtained and recovered by pouring into water was found to behave entirely differently when dissolved or dispersed in a cellulose acetate plasticizer, high boiling point, low vapor pressure solvent, or mixtures thereof, and used for bonding laminations of cellulose acetate plastic and glass in that the resulting finished lamination on break testing was found to possess excellent adhesion even though the same sample of cellulose acetate resulted in improper adhesion prior to treatment in accordance with my invention.

In one series of tests, I took sixteen different types of cellulose acetate, practically all of which gave absolutely no adhesion when attempts were made to use them as adhesives before the above mentioned treatment, and without fail the entire sixteen different types of cellulose acetate all gave excellent adhesion after the treatment which is strongly persuasive of the fact that the reaction gives what may be called a common product, characterized by its ability to produce adhesion between cellulose acetate plastic and glass under the conditions of the laminating process.

I have also found, as a result of additional experiments, that other depolymerizing agents similar in nature to the phosphorus oxychloride can be used in lieu of the phosphorus oxychloride in the carrying out of the process. I have used as depolymerizing agents for reaction with the solutions of cellulose acetate, in addition to the phosphorus oxychloride, the following: anhydrous stannic chloride; anhydrous aluminum chloride; sulfuryl chloride; thionyl chloride; iron chloride; antimony trichloride; antimony pentachloride; phosphorus trichloride; and phosphorus pentachloride.

It was also found that any of the above mentioned sixteen samples of cellulose acetate treated or reacted with any of the above mentioned depolymerizing agents in the proper manner produced a reaction product from the cellulose acetate which has characteristics entirely different from the original cellulose acetate before it was reacted with the said depolymerizing agents.

The reaction product is characterized by the remarkably good adhesion obtainable when dissolved or dispersed in cellulose acetate plasticizers, high boiling point, low vapor pressure solvents, or mixtures thereof. While it may be desirable in some cases to apply my improved bonding material directly upon the surfaces of the glass sheets, nevertheless I have found that equally satisfactory results can be obtained when my bonding material is applied to the cellulose acetate plastic sheet itself and then assembling the said coated plastic layer between properly cleaned glass sheets to form a sandwich which is subsequently subjected to the action of heat and pressure.

I have obtained excellent results in the way of bonding cellulose acetate plastic-glass laminations to form a well bonded unitary structure by subjecting the glass-plastic sandwich to a temperature of approximately 300° F. at a pressure ranging from 40 pounds to 200 pounds per square inch for a period of from six to eight minutes.

An example of one procedure used in the treatment of the cellulose acetate to obtain the reaction product described above is as follows:

To 100 grams of cellulose acetate dissolved in two liters of acetone is added 15 cc. of phosphorus oxychloride. This mixture is refluxed on a steam bath for two hours, allowed to cool, and then slowly poured with stirring into 25 liters of water to precipitate the reaction product. The reaction product is filtered, washed thoroughly, and then dried.

Another example of a method for treating the cellulose acetate to obtain the reaction product described above is as follows:

10 grams of anhydrous aluminum chloride is added to a solution of 100 grams of cellulose acetate in 2 liters of acetone. This mixture is refluxed for 30 minutes, and after cooling is poured with stirring into 25 liters of water to precipitate the reaction product. The reaction product is filtered, washed thoroughly, and then dried.

As has been stated above, the adhesives made from the reaction products are prepared by dispersing or dissolving the said material in suitable plasticizers, high boiling point, low vapor pressure solvents, or mixtures thereof. I have found a number of plasticizers or high boiling point, low vapor pressure solvents which work satisfactorily when used to disperse or dissolve my reaction product. For example, dimethyl phthalate, diethyl phthalate, triacetin, ethyl lactate, benzyl alcohol, benzyl acetate, or various combinations or mixtures of these plasticizers and solvents can be used. I have also found that the ratios of the reaction product and plasticizers or solvents are very broad. For example, I have obtained excellent results by using as an adhesive a mixture containing 5% of the reaction product in dimethyl phthalate; likewise, I have obtained excellent results by using as an adhesive mixture 70 parts of the reaction product dispersed in 30 parts of dimethyl phthalate. In the latter mixture, it is of course necessary that it be diluted with suitable volatile solvents such as acetone, ethyl acetate, or the like, to obtain the desirable consistency for spraying or otherwise coating the adhesive in a relatively thin film on either the glass or cellulose acetate plastic surfaces.

It will be appreciated that in the selection of plasticizers or solvents for use in the placing of the reaction product in solution, such plasticizers and solvents as are intended to remain in the safety glass should be of such character that they will be stable in the safety glass and will not tend to adversely affect the cellulose acetate plastic. In those cases where the volatile solvents such as acetone are employed as a part of the solvent mixture, it will be understood that I prefer to permit evaporation of such volatile solvents from the film prior to the bonding of the various laminations together.

Every sample of cellulose acetate which I have been able to obtain, when treated in accordance with the process above described, has resulted in a reaction product that can be dissolved or dispersed in suitable plasticizers and solvents and then used as an adhesive between glass and cellulose acetate plastic. While the invention relates primarily to the bonding of the glass and cellulose acetate plastic, nevertheless the same reaction product can be used in preparing an adhesive for use in the bonding of glass and other cellulose ester plastics such as, for example, pyroxylin plastic.

I claim:

1. As a new article of manufacture, a sheet of laminated glass including two sheets of glass and an interposed sheet of cellulose ester plastic bonded together to provide a composite structure by a bonding material consisting of a reaction product, formed by treating a cellulose acetate solution with a depolymerizing agent, dissolved in a plasticizer therefor.

2. As a new article of manufacture, a sheet of laminated glass including two sheets of glass and an interposed sheet of cellulose ester plastic bonded together to provide a composite structure by a bonding material consisting of a reaction product formed by treating a solution of cellulose acetate and acetone with a depolymerizing agent, the reaction product being recovered by precipitation in a water solution and dissolved or dispersed in dimethyl phthalate.

3. The process of producing safety glass comprising two sheets of glass and an interposed sheet of transparent cellulose ester plastic, including the step of preparing a bonding material for said sheets, said bonding material consisting of a reaction product formed by treating a cellulose acetate solution with a depolymerizing agent dissolved in a plasticizer therefor.

4. The process of producing safety glass comprising two sheets of glass and an interposed sheet of transparent cellulose ester plastic, including the step of preparing a bonding material for said sheets, said bonding material consisting of a reaction product formed by treating a solution of cellulose acetate and acetone with a depolymerizing agent, the reaction product being recovered by precipitation in a water solution and dissolved or dispersed in dimethyl phthalate.

5. The process of producing safety glass comprising two sheets of glass and an interposed sheet of transparent cellulose ester plastic, including the steps of preparing a bonding material for said sheets by dissolving cellulose acetate in a solvent, then treating the same with a depolymerizing agent for approximately two hours, the reaction product thereby obtained being recovered by precipitation in water, and then dissolving or dispersing said reaction product in a high boiling point, low vapor pressure solvent therefor.

6. The process of producing safety glass comprising two sheets of glass and an interposed sheet of transparent cellulose ester plastic, including the steps of preparing a bonding material for said sheets by dissolving cellulose acetate in a solvent; then treating the same with a depolymerizing agent for approximately two hours, the reaction product thereby obtained being then precipitated by pouring into water and recovered from the water solution, dried, and dispersed or dissolved in a suitable solvent or plasticizer.

7. The process of producing safety glass comprising two sheets of glass and an interposed sheet of cellulose ester plastic, consisting in applying a bonding material, composed of a reaction product formed by treating a cellulose acetate solution with a depolymerizing agent dissolved in a plasticizer therefor, to said laminations, arranging the laminations in proper superimposed relationship, and then subjecting the sandwich thus formed to the action of heat and pressure.

8. As a new article of manufacture, a sheet of laminated glass including two sheets of glass and an interposed sheet of cellulose ester plastic bonded together to provide a composite structure by means of an adhesive formed from a partially depolymerized cellulose acetate.

9. As a new article of manufacture, a sheet of laminated glass including two sheets of glass and an interposed sheet of cellulose ester plastic bonded together to provide a composite structure by means of an adhesive formed from a partially depolymerized cellulose acetate and a plasticizer therefor.

10. The process of producing safety glass comprising two sheets of glass and an interposed sheet of cellulose ester plastic, consisting in applying an adhesive formed from a partially depolymerized cellulose acetate between said laminations, and then subjecting the assembly so formed to the application of heat and pressure to render the cellulose ester plastic lamination adherent to the glass sheets.

ROY W. WAMPLER.